US011074247B2

(12) United States Patent
Phagan (10) Patent No.: US 11,074,247 B2
(45) Date of Patent: Jul. 27, 2021

(54) READ AND WRITE ACCESS TO SORTED LISTS

(71) Applicant: Microsoft Technology Licensing, LLC, Redmond, WA (US)

(72) Inventor: Brian David Phagan, Kenmore, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 730 days.

(21) Appl. No.: 15/625,670

(22) Filed: Jun. 16, 2017

(65) Prior Publication Data

US 2018/0365286 A1 Dec. 20, 2018

(51) Int. Cl.
*G06F 16/23* (2019.01)
*G06F 16/951* (2019.01)
*G06F 16/9535* (2019.01)

(52) U.S. Cl.
CPC .......... *G06F 16/2393* (2019.01); *G06F 16/23* (2019.01); *G06F 16/951* (2019.01); *G06F 16/9535* (2019.01)

(58) Field of Classification Search
CPC .. G06F 16/2393; G06F 16/23; G06F 16/9535; G06F 16/951
See application file for complete search history.

(56) References Cited

U.S. PATENT DOCUMENTS

| | | | |
|---|---|---|---|
| 8,968,067 B1 | 3/2015 | Curtis et al. | |
| 9,299,064 B1 | 3/2016 | Liu et al. | |
| 9,489,447 B2 | 11/2016 | Wollenstein et al. | |
| 2002/0115488 A1* | 8/2002 | Berry | A63F 13/12 463/42 |
| 2002/0119824 A1* | 8/2002 | Allen | A63F 13/12 463/42 |
| 2003/0073471 A1* | 4/2003 | Varley | A63F 13/31 463/1 |
| 2004/0198495 A1* | 10/2004 | Cisneros | G07F 17/3295 463/42 |
| 2005/0182773 A1* | 8/2005 | Feinsmith | G06Q 10/10 |

(Continued)

OTHER PUBLICATIONS

"Fast and Reliable Ranking in Datastore", https://cloud.google.com/datastore/docs/articles/fast-and-reliable-ranking-in-datastore/, Published on: Oct. 5, 2016, 20 pages.

(Continued)

*Primary Examiner* — Jensen Hu
(74) *Attorney, Agent, or Firm* — Alleman Hall Creasman & Tuttle LLP (57) ABSTRACT

Disclosed is a system for managing reads and writes to a sorted list of parameter values held in a write subsystem. Each parameter value is changeable and associated with a user. A read subsystem holds a persistent copy of the parameter values, which may be inconsistent with the write system values due to pending updates of one or more of the parameter values in the write subsystem. The system batch updates parameter values to the persistent copy from the write subsystem, but in the event of a read request, (1) the system determines whether the requested parameter value is inconsistent with the persistent copy; and (2) if so, produces a real-time update of the requested parameter value in the persistent copy without waiting for a batched update for the requested parameter value.

15 Claims, 5 Drawing Sheets

(56) References Cited

U.S. PATENT DOCUMENTS

| | | | |
|---|---|---|---|
| 2011/0065511 A1 | 3/2011 | Mahan et al. | |
| 2012/0284611 A1* | 11/2012 | Burckart | H04L 67/02 |
| | | | 715/234 |
| 2012/0322561 A1 | 12/2012 | Kohlhoff | |
| 2013/0157736 A1* | 6/2013 | Smith | A63F 13/327 |
| | | | 463/7 |
| 2013/0260888 A1 | 10/2013 | Thornton et al. | |
| 2013/0297906 A1* | 11/2013 | Loh | G06F 13/1642 |
| | | | 711/167 |
| 2014/0289188 A1* | 9/2014 | Shimanovsky | H04W 8/16 |
| | | | 707/609 |
| 2016/0147562 A1* | 5/2016 | Ferrandiz | G06F 9/4843 |
| | | | 718/101 |

OTHER PUBLICATIONS

Turbeck, et al., "Reliable Actors design pattern: smart cache", https://github.com/Huachao/azure-content/blob/master/articles/service-fabric/service-fabric-reliable-actors-pattern-smart-cache.md, Published on: Nov. 14, 2015, 6 pages.

* cited by examiner

402 — HOLDING, WITHIN A WRITE SUBSYSTEM, A SET OF PARAMETER VALUES, EACH OF WHICH IS ASSOCIATED WITH A USER THAT CAUSED THAT PARAMETER VALUE TO BE SUBMITTED TO THE WRITE SUBSYSTEM, EACH PARAMETER VALUE BEING CHANGEABLE IN RESPONSE TO USER ACTION

404 — HOLDING, WITHIN A READ SUBSYSTEM, A PERSISTENT COPY OF THE SET OF PARAMETER VALUES, THE PERSISTENT COPY OF THE SET OF PARAMETER VALUES BEING VARIOUSLY INCONSISTENT WITH THE SET OF PARAMETER VALUES IN THE WRITE SUBSYSTEM DUE TO PENDING UPDATES NOT YET MIGRATED FROM THE WRITE SUBSYSTEM

406 — PERIODICALLY CAUSING BATCHED UPDATES FROM THE WRITE SUBSYSTEM TO THE READ SUBSYSTEM, SUCH BATCHED UPDATES INCLUDING WRITING PARAMETER VALUES THAT HAVE CHANGED IN THE WRITE SUBSYSTEM RELATIVE TO THE PERSISTENT COPY TO THE PERSISTENT COPY

408 — RECEIVING A REQUEST TO READ A PARAMETER VALUE ASSOCIATED WITH A USER

410 — IF THE REQUESTED PARAMETER VALUE IS NOT UPDATED IN THE PERSISTENT COPY AT THE TIME OF THE REQUEST, PRODUCING A REAL-TIME UPDATE OF THE REQUESTED PARAMETER VALUE BY WRITING IT TO THE PERSISTENT COPY WITHOUT WAITING FOR A BATCHED UPDATE

412 — DISPLAYING THE REAL-TIME UPDATE TOGETHER WITH ONE OR MORE OTHER PARAMETER VALUES IN THE PERSISTENT COPY

READ AND WRITE ACCESS TO SORTED LISTS

BACKGROUND

Computing systems often make use of large sorted lists. When read requests are submitted to such lists, some returned results may not reflect recent updates to the list. These inconsistencies, and the rate and manner in which they are resolved, are functions of the read and write mechanisms associated with the sorted list.

DETAILED DESCRIPTION

Computing systems often make use of large sorted lists. When read requests are submitted to such lists, some returned results may not reflect recent updates to the list. These inconsistencies, and the rate and manner in which they are resolved, are functions of the read and write mechanisms supporting the sorted list.

Database systems supporting large sorted lists typically are not optimized for both fast reads and writes. One potential solution for increasing speed is to have reads and writes both access the same or limited number of common resources (e.g., reading and writing to the same copy/set of data). In the case of large quantities of data, however, this can cause contention and hinder performance. Contention may in some cases be reduced by separating read and write subsystems. This however, can lead to increased latency in having up-to-date values accessible from the read subsystem.

Read latency in many cases can be tolerated to some degree, but in some cases users will want on-demand access to just-submitted updates. One such setting is a competitive gaming environment in which a player wants to see their performance (e.g., score) immediately in the context of other scores in a leaderboard showing scores from all or a subset of other players.

The present description contemplates managing reads and writes to a sorted list of parameter values via separate write and read subsystems. The write subsystem holds a set of parameter values (e.g., scores). Each parameter value is associated with a user that caused it to be submitted to the write subsystem. The parameter value can change from time to time via actions of the user (e.g., improving a score).

The read subsystem holds a persistent copy of the set of parameter values. In one example, the values in the persistent copy are sorted by level/value, as in the mentioned leaderboard example. The persistent copy is variously inconsistent with the set of parameter values in the write subsystem. This is due to new contributions submitted to the write subsystem, resulting in pending updates not yet migrated to the persistent copy.

Migrates of updates from the write subsystem are performed in batches of parameter values (e.g., updates from a partition of 10,000 users are written at the same time). In other words, updates do not occur dynamically in real time as parameter values are submitted to the write subsystem. Such an approach could result in processing inefficiencies due to individual/asynchronous update actions and other factors.

In some cases, however, there is a desire to immediately see the value of an update in the context of the sorted list. For example, a player might want to immediately see where a just-achieved score sits in the context of the current leaderboard. Accordingly, when confronted with a read request, the present system may check to determine if an update is pending for the requested parameter value. If so, the system will pre-empt the scheduled batch update for that parameter value, and immediately insert it into the persistent copy in the read subsystem (e.g., in a leaderboard view). This enables users to immediately see their values in context, while limiting, if desired in a given setting, real-time updates to only when they are requested.

Figure 1:
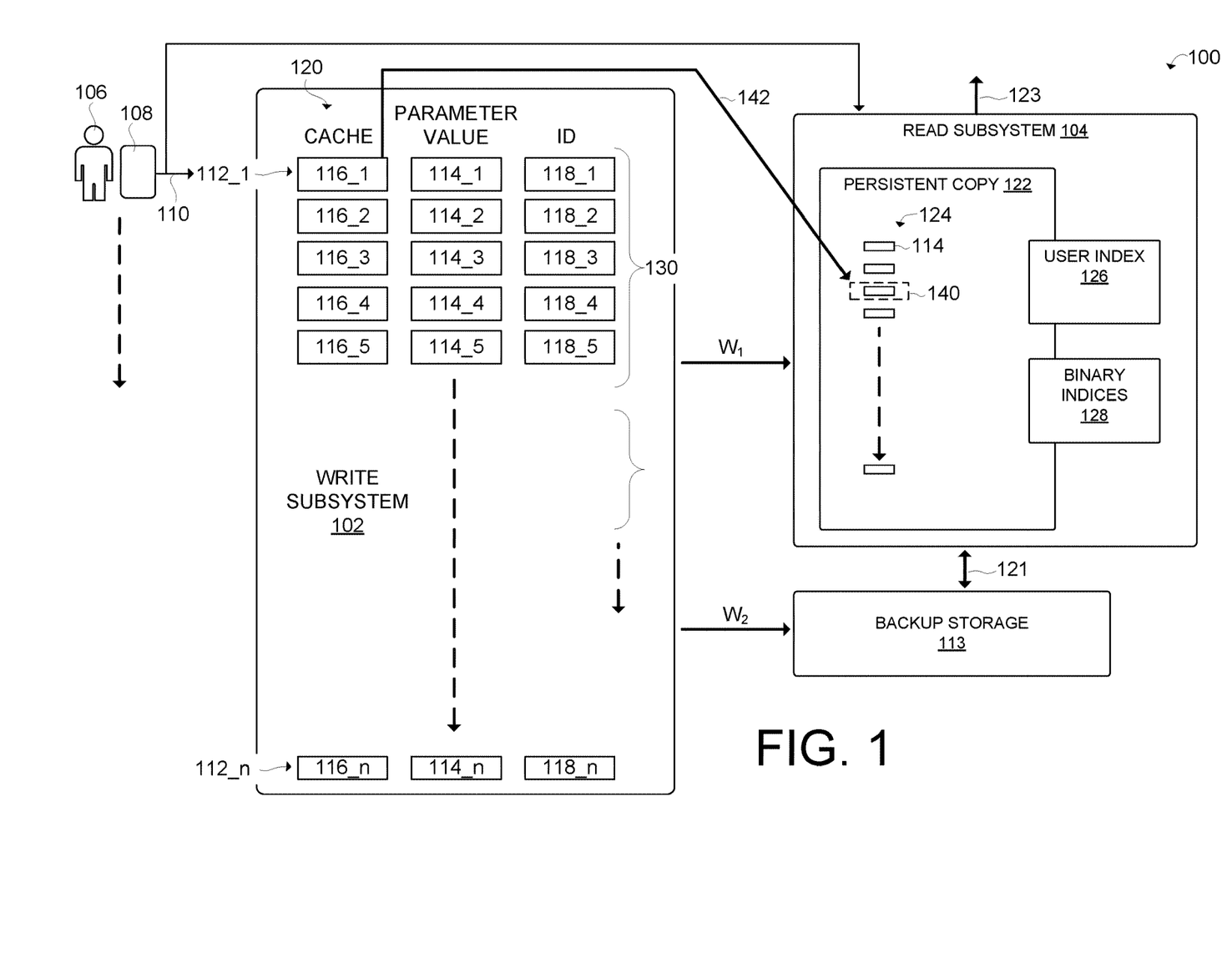
FIG. 1 depicts a system for managing reads and writes for a sorted list of parameter values.

FIG. 1 depicts a system 100 for managing reads and writes to a sorted list of parameter values, such as scores in a game or any other item that can be positioned in a sorted list. System 100 includes a write subsystem 102 and a read subsystem 104. A plurality of users 106 interact with the system (e.g., with user devices 108). For example, interaction 110 may be a submission to the write subsystem 102 to create and/or affect an entry 112 for that user, and or it may be a read request, as explained below, to read a parameter value and/or other data associated with the user. Any number of users and entries 112 may be involved (i.e., user-corresponding entries 112_1 through 112_n are shown to indicate any practicable number). System 100 may further include backup storage 113 for holding parameter values and other information.

Each entry 112 includes a parameter value 114, and may also include a cache 116 and user ID 118. Thus, a set 120 of parameter values 114 (and associated caches and user IDs, if present) are contained within write subsystem 102. When included, cache 116 may facilitate migration of updates from the write subsystem 102 to the read subsystem 104, as will be explained below. User ID 118 may be variously used within the described systems and methods to identify a parameter value or other information as being connected to a particular user.

In general, writing and reading of parameter values are as follows: A user 106 submits a new or updated parameter value (e.g., score) to write subsystem 102, for example via interaction 110. User parameter values 114 are at some point migrated to read subsystem 104 and optionally to backup storage 113 via write operations $W_1$ and $W_2$. Read subsystem 104 and backup storage 113 may also interact (e.g., as shown at 121) to provide redundancy and for various other reasons. When in the form of a read request (e.g., for a score or other parameter value), interaction 110 may be a request to the write subsystem 102 and/or the read subsystem 104. Indeed, as will be addressed below, a read request in some cases will make reference to a cache or other portion of the write subsystem 102 in order to trigger a real-time update for a parameter value 114 in advance of when a normally scheduled update would occur. Regardless of the form of read request, read subsystem 104 may supply an output 123, such as a display of selected scores, metrics or other parameter values, for example in the form of a full or partial leaderboard as will be described with reference to FIG. 3.

The user-associated parameter values 114 may take many forms. Examples include scores, grades, achievement levels, performance metrics, records, tallies, and the like. In some examples, the parameter value is a score, achievement, etc., associated with a multiplayer game (e.g., online cloud-enabled). In these and other examples, it is often desirable to have parameter values be placed in relative context, for example to see a ranking or other representation of the relative levels of parameter values associated with different users. From the perspective of an individual user, they typically will be interested in seeing the level of their specific parameter value relative to that of other users (e.g., in a ranked leaderboard for an online game).

Read subsystem 104 is configured, among other things, to enable user-associated parameter values to be read out. This may be done to provide the contextual view mentioned above, such as a game leaderboard. Read subsystem 104 holds a persistent copy 122 of the parameter values 114, and the parameter values may be stored/arranged as a sorted list 124, which may be sorted based on relative levels of the parameter values in the list (e.g., ranked by parameter value level). In certain examples, such as a leaderboard in a game setting, the user ID 118 may be employed while reading sorted list 124 to indicate specific players associated with scores.

Various indices may be used in connection with reading from persistent copy 122. Reading in some cases may be triggered by a read request (such as interaction 110) from a user (e.g., user 106) to read the parameter value 114 associated with the requesting user. A user index 126 may be constructed on top of sorted list 124 in order to find the parameter value for the requesting user. Then, a binary search tree index 128 (or indices) constructed on the sorted list 124 may be used in order to find other parameter values having levels related to that of the parameter value of the requesting user. Related levels might show the requesting user's overall ranking, parameter values in the vicinity of that of the requesting user, etc. In one example, the binary search tree index is used to find all parameter values to one side of the user's parameter value (e.g., all users with higher levels).

The persistent copy 120 is variously inconsistent with the set 120 of parameter values 114 in the write subsystem 102 due to pending updates to some of the parameter values that are not yet migrated to the persistent copy from the write subsystem 102. For example, a submission by a user 106 of a new level for their parameter value 114 to the write subsystem 102 will cause that parameter value to be inconsistent (i.e., have a more current value) than what is in the persistent copy 122. At any given time, many parameter values 114 in the persistent copy 122 may be stale due to pending updates not yet being written from the write subsystem 102.

It will be appreciated that in many settings, it may be desirable to intelligently control updates to the read subsystem 104. For example, to minimize contention, intense access activity, and other burden on the read subsystem 104, updates can be performed on a periodic schedule that batches updates together. Thus, a desired degree of optimization may be achieved in terms of how the persistent copy 122 is accessed. In some examples, a timer may be associated with a group of parameter values 114 and, at the expiration of the timer, any parameter value in that group that has been updated in the write subsystem 102 (i.e., is inconsistent with the value in persistent copy 122) is written to the read subsystem 104 in the batched update, e.g., via executable instructions associated with the write subsystem.

In a high-activity system with a large number of parameter values, this batched approach can limit contention and other burdens on the read subsystem, thereby reducing interference with read operations and other functioning of the read subsystem 104.

All of the parameter values 114 in the write subsystem 102 may be grouped together for purposes of batched updates, or subgroupings may be employed. In the depicted example, the set of parameter values are divided into partitions 130. For example, in a large on-line gaming setting with hundreds of thousands of users, each partition might have 10,000 users due to application constraints, bandwidth considerations or other factors. Partitions, where employed, may be fixed or vary dynamically over time. One example way of creating such a partition is to hash the user ID 118 so that all users with same hash value are partitioned together. The batched updates mentioned above may be performed per partition or according to any other grouping.

Some degree of update latency (e.g., migrating batch updates on a timed delay schedule) may be acceptable in many cases, and, as mentioned above, can provide some optimization. A user with a new score, metric, etc. may be satisfied at the mere achievement of it, without needing/wanting to immediately see it in the context of a leaderboard, for example. On the other hand, if there is an immediate request for a view of the leaderboard, it can be inferred that they want to see their new contribution in context.

Accordingly, the present disclosure contemplates use of the batched update mechanism together with an alternate bypass of that mechanism. Specifically, the bypass enables a real-time update of a parameter value 114 without having to wait for a batched update that is scheduled for that parameter value. This enables low latency retrieval of updated parameter values 114 when desired, while retaining, in many/most cases, the batched mechanism and the advantages it may confer in a given setting, such as reducing the frequency/quantity of update activity.

FIG. 1 may be used to illustrate real-time updating versus batched updating of parameter values 114. Assume first that user 106 contributes a new or updated level for parameter value 114_1 to the write subsystem 102 (e.g., via interaction 110). The parameter value may be cached locally in cache 116_1. Whether a batched update or a real-time update occurs may depend on whether and when the contributing user submits a read request (e.g., via interaction 110). If such a request does not occur within some period of time (e.g., upon expiration of a periodic batch timer), a normal batched update would proceed. This might entail, for example, upon expiration of a timer, determining whether the parameter value 114_1 from the user had been written to the persistent copy 122 in the read subsystem 104. If the parameter value 114_1 had not been written, the write request would be retried until confirmation of the batched update was established. Once the parameter value is written to the persistent copy, the cache 116_1 is flushed and, as discussed below, read requests are directed to the persistent copy 122. Typically, as indicated above, the batch update is associated with multiple users 106, such that multiple parameter values 114 for multiple users are written at the expirations of the batch timer (e.g., all updates within a partition 130). Again referring to a leaderboard example, a batched update might happen if the user waited a minute or two after achieving a score to request a leaderboard view.

If, on the other hand, the user issues a read request 110 before the parameter value 114_1 is committed, then the timer mechanism may be bypassed. Specifically, the system responds to the read request by determining whether the requested parameter value 114_1 is updated in the persistent copy 122. Typically, this determination is made with reference to the write subsystem 102; specifically it may be made via a check of the cache 116_1 for the parameter value 114_1. If it is not updated at the time of the request, the system produces a real-time update 140 of the requested parameter value by writing it to the persistent copy 122 in the read subsystem 104 without waiting for the scheduled batch update for the parameter value.

As indicated at 142, this on-demand operation may involve writing from the respective cache 116_1 to the persistent copy 122 of the parameter values. In other words, in the example of the batch timer, the read request triggers direct insertion of the updated parameter value into the persistent copy in the read subsystem 104 before expiration of the timer. Thus, as further described below, the bypass triggered by the user's read request will enable their real-time updated parameter value to be positioned in the context of other parameter values in the sorted list 124. A competitive achievement could then be immediately viewed in the context of a leaderboard. While one or more other displayed entries may be stale, it will be appreciated that users in gaming and similar settings will often nonetheless value the contextual presentation of their result, and the immediacy of the display will provide an enhanced user experience.

Backup storage 113 may be used for a variety of purposes. Generally, it may be used to hold copies of the parameter values 114 in any structure, format or arrangement. In some implementations, it is not optimized for providing sorted readout of parameter values, but rather is a redundant storage mechanism to facilitate recovery of data and/or repopulating of values in the read subsystem 104. Backup storage 113 may be used, for example, during startup of the system.

In some examples, it will be appreciated that persistent copy 122 is not fully/completely persistent in the strictest sense. Its "persistence" refers to its stable hosting of a sorted list of parameter values that can be read out through the course of ongoing dynamic operation, thereby providing viewable data representations (e.g., of a leaderboard) that are persistently available during system operation. But, on the other hand, the sorted list of parameter values in persistent copy 122 may be lost in the event of system restart and other circumstances. In such a case, the persistent copy may be reconstructed from user parameter values held in other locations, such as write subsystem 102 and/or backup storage 113. In a more specific example of reconstruction, the write subsystem 102 may read from backup storage 113 to repopulate the parameter values in its partitions, and it in turn can write those values to repopulate/reconstruct the read subsystem 104 and persistent copy 122.

Figure 2:
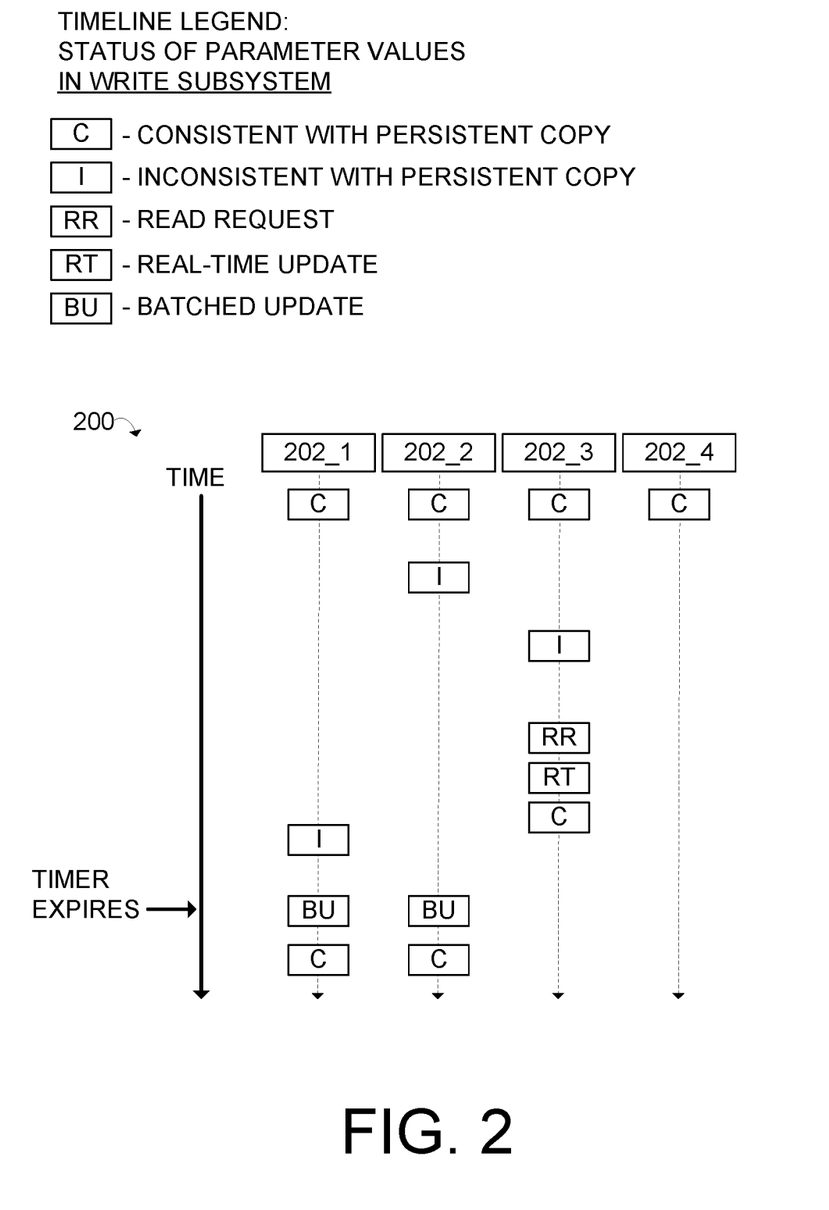
FIG. 2 depicts a timeline associated with processes for updating parameter values via migration from a write subsystem to a read subsystem.

FIG. 2 depicts a timeline 200 showing states and associated read/write actions for four example parameter values 202_1 through 202_4. These parameter values may correspond to those shown in FIG. 1. At each point along the timeline, the parameter value is in one of four states:

(1) "C"—Consistent with the persistent copy 122 (FIG. 1).

(2) "I"—Inconsistent with the persistent copy 122, e.g., as a result of user 106 submitting an update to the write subsystem 102 that has not yet been committed (FIG. 1).

(3) "RR"—Read request. As previously discussed, this may happen in some cases shortly after a user has caused an updated parameter value 202 to be submitted to the write subsystem 102 (e.g., a desire to immediately see one's just-achieved score on a leaderboard).

(4) "RT"—Real-time update. As previously discussed, this refers to generating a real-time update to a parameter value 202, thus causing it to be immediately inserted into the persistent copy 122 prior to an upcoming scheduled batch update for the parameter value 202.

Typically, this causes an associated cached copy of the update to be flushed and a redirection of read requests for the value to the persistent copy 122 in the read subsystem 104.

From the figure, it will be appreciated that parameter values 202_1 and 202_2 are updated at the same time via a batch update, which returns those parameter values to a consistent state after the values are migrated to the read subsystem. They are batch updated at the same time despite their values being submitted to the write subsystem at different times (parameter value 202_2 goes inconsistent/pending via an update submission sooner than parameter value 202_1). Regarding parameter value 202_4, no update is submitted during the batch timer interval, so it remains consistent and no update is needed. Typically, however, its value will be held within the write subsystem 102 despite also being maintained in the persistent copy 122 in the read subsystem 104.

Referring to parameter value 202_3, a read request is made for the parameter value shortly after the value is submitted to the write subsystem 102, but before the batch timer has expired. Therefore, as described above, a real-time update 140 of the parameter value is inserted into the read subsystem 104 before the scheduled batch update. This pre-emption of the scheduled update causes the current parameter value to be pushed into the read subsystem 104 before parameter values 200_1 and 200_2, and this may even be the case where the update of parameter value 200_2 was submitted to the write subsystem 102 earlier.

Typically, in addition to performing the real-time update, the system responds to the read request for a parameter value by causing the real-time parameter value to be displayed with other parameter values. For example, a real-time update score may be shown on a leaderboard (or portion thereof) for a game. From the above, it will be appreciated that in some cases, the other displayed parameter values may have pending updates in the write subsystem that have not been processed. Still further, with reference to parameter value 200_3 (FIG. 2), the real-time update value in some cases may be displayed with parameter values that have longer-pending updates. Specifically, the real-time update may be caused by a submission to the write subsystem 102 subsequent to that of other parameter values displayed with it.

Figure 3:
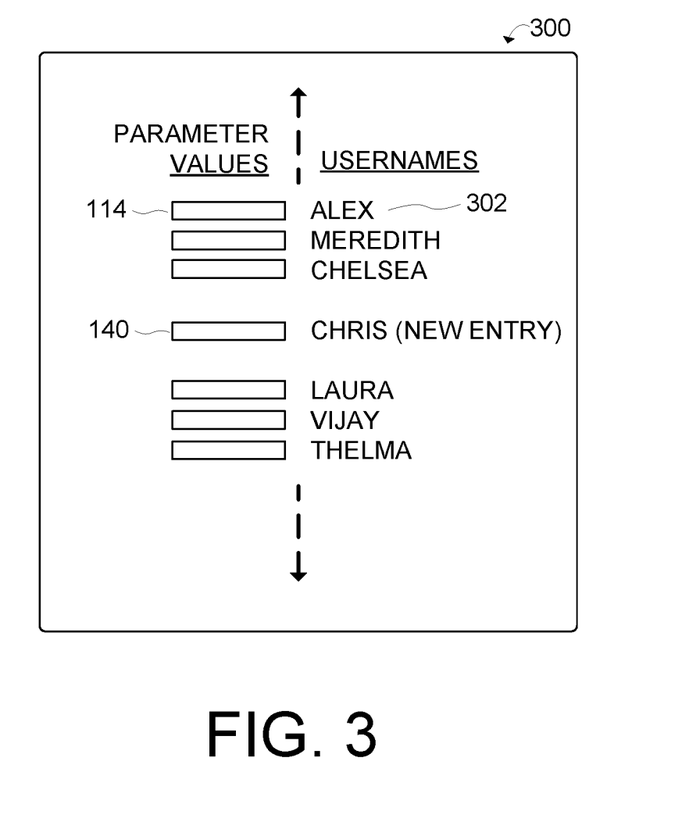
FIG. 3 depicts a display of a real-time update of a parameter value together with other parameter values.

FIG. 3 depicts an example of how a real-time updated parameter value (i.e., updated as described above ahead of a scheduled update) may be displayed together with other parameter values. The figure depicts a display 300 which may be of any type and associated with any type of computing device. Example display and computing systems will be described in more detail with reference to FIG. 5.

FIG. 3 shows real-time update 140 (FIG. 1) as displayed along with a number of other parameter values 114 from persistent copy 122. Typically, the other parameter values are based on a level of the real-time update 140 in order to provide a ranking or other comparison. For example, the display of FIG. 3 may be a leaderboard for an online game, in which usernames 302 are associated with the parameter values 114. In the depicted example, levels are displayed above and below the real-time update—a new entry from user "Chris"—though any other arrangement may be employed to place the real-time update in the context of one or more other parameter values 114 in the persistent copy 122. Filtering may also be employed in some settings, so that parameter values are retrieved based on other factors. For example, in a game setting, the real-time update may be positioned among scores from friends, noteworthy opponents, players connected via social networks, etc. Any type of filtering/selection may be employed.

As described above, the display 300 may be generated using various indices built upon sorted list 124 (FIG. 1). In one example, a query is performed using the user ID 118 of the user that triggered the real-time update. This query returns the value of the real-time update 140 that was just submitted by the user. The returned value is then directly usable within the value index built on the sorted list (e.g., binary search tree indices 128). Such an approach may be implemented more efficiently than conventional database approaches.

More specifically, it will be appreciated from the above that read requests and write requests may follow different access patterns, and the present systems and methods achieve a degree of optimization by handling them in separate read and write subsystems that treat them differently. In some examples, user ID 118 is hashed for write operations to determine storage location for the user (e.g., which partition/batch to place the user's parameter value in). Read requests may be implemented to not hash the user ID 118. The read request, in a leaderboard setting, is directed to the to the indices built on top of the leaderboard scores. Using the user ID index 118, (1) the user's score on the board is found, and (2) the system then uses one of the binary tree indexes to seek to that user's position relative to other scores (e.g., top 100, etc.). By using different systems to respond to read and write requests, the leaderboard system may be optimized for both. One specific example, as mentioned above, is that the large majority of update writing to the read system is pushed over from the write subsystem in an orderly, scheduled way—i.e., with scheduled batched updating. The system may be implemented so that it handles updates outside of the batch schedule when (1) a user requests a leaderboard read, and (2) that user has a pending update.

Figure 4:
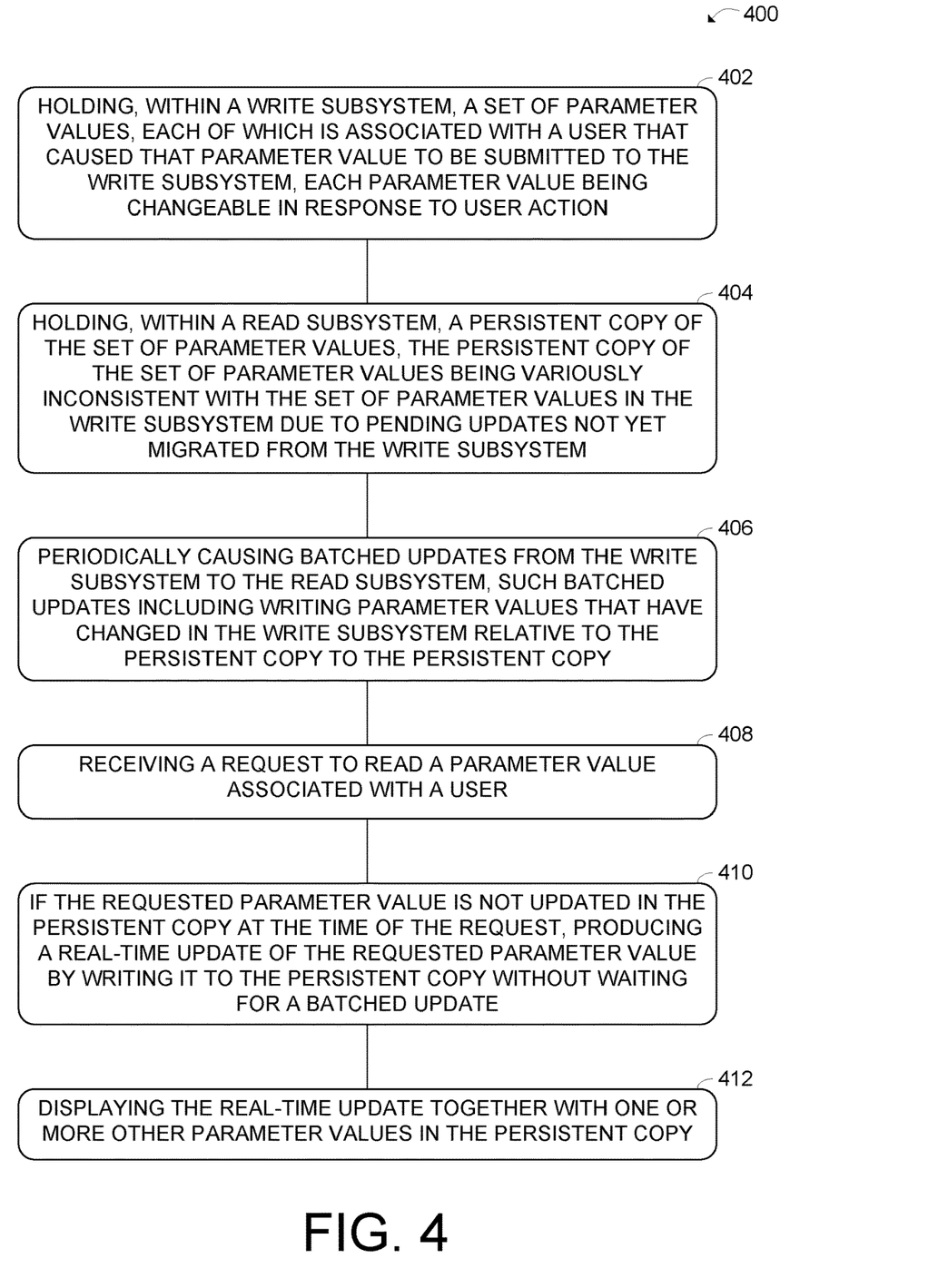
FIG. 4 depicts an exemplary method for managing reads and writes in connection with a sorted list of parameter values.

Referring now to FIG. 4, the figure shows a method 400 for managing reads and writes from and to a sorted list of parameter values associated with users. Although occasional references will be made to the systems described above, it will be appreciated that the method may be carried out in connection with modifications to those systems, and/or with different configurations appropriate to the method.

At 402, the method includes holding, within a write subsystem, a set of parameter values. Each parameter value is associated with a user that caused that parameter value to be submitted to the write subsystem, and each parameter value is changeable in response to user action.

At 404, method 400 includes holding, within a read subsystem, a persistent copy of the set of parameter values. The persistent copy is variously inconsistent with the set of parameter values in the write subsystem due to pending updates not yet migrated from the write subsystem. Some examples include many thousands of users having associated parameter values that are dynamically changing. Reads for those values are serviced from the read subsystem, though at any given time, a large number of the parameter values that might be read may have updates pending. In other words, they would have updates that had been submitted to the write subsystem but that had not yet been migrated over the to the read subsystem.

At 406, method 400 includes periodically causing batched updates from the write subsystem to the read subsystem. This includes writing parameter values to the persistent copy that have changed in the write subsystem relative to the persistent copy. Typically, this includes use of a timing or other mechanism that causes updates to be scheduled, such as at regularly occurring intervals. As indicated above, one example includes partitioning or otherwise grouping users and running batched updates for the group together.

At 408, the method includes receiving a request to read a parameter value associated with a user. At 410, the request is processed to assess whether a real-time update, as referenced above, is to be triggered. Specifically, if the requested parameter value is not updated in the persistent copy at the time of the request, the method includes producing a real-time update of the requested parameter value by writing it to the persistent copy without waiting for a batched update. As discussed with reference to FIG. 1, determining that the persistent copy is not updated for the requested parameter value may include referring to the write subsystem and, more specifically, to a local cache in the write subsystem associated with the requested parameter value.

In many cases, as shown at 412, the real-time update may be displayed together with one or more other parameter values in the persistent copy. As described above with reference to FIG. 3, such a display may be based on levels of the real-time update and the other parameter values to provide a comparison (e.g., a leaderboard for an on-line game).

To construct the display, a read operation may be performed on the persistent copy as described above with reference to FIG. 1. Specifically, for a requesting user associated with the real-time update, a user ID may be used to retrieve the level of the real-time update (e.g., a specific just-updated score). The retrieved level may then be used to navigate one or more tree-based indices (e.g., binary trees) to find other parameter values, such as a specified number of entries above or below the value of requesting user.

Often, one or more of the other displayed parameter values will be stale in the sense that they have updates pending in the write subsystem that have not been processed. Still further, the bypass mechanism is such that, in some cases, the "stale" entries displayed with the real-time update will have been queued into the write subsystem before the real-time update. In other words, for one or more other parameter values displayed with the real-time update that have pending updates, the real-time update may have been caused by a submission to the write subsystem subsequent to that of those other parameter values.

In some embodiments, the methods and processes described herein may be tied to a computing system of one or more computing devices. In particular, such methods and processes may be implemented as a computer-application program or service, an application-programming interface (API), a library, and/or other computer-program product.

Figure 5:
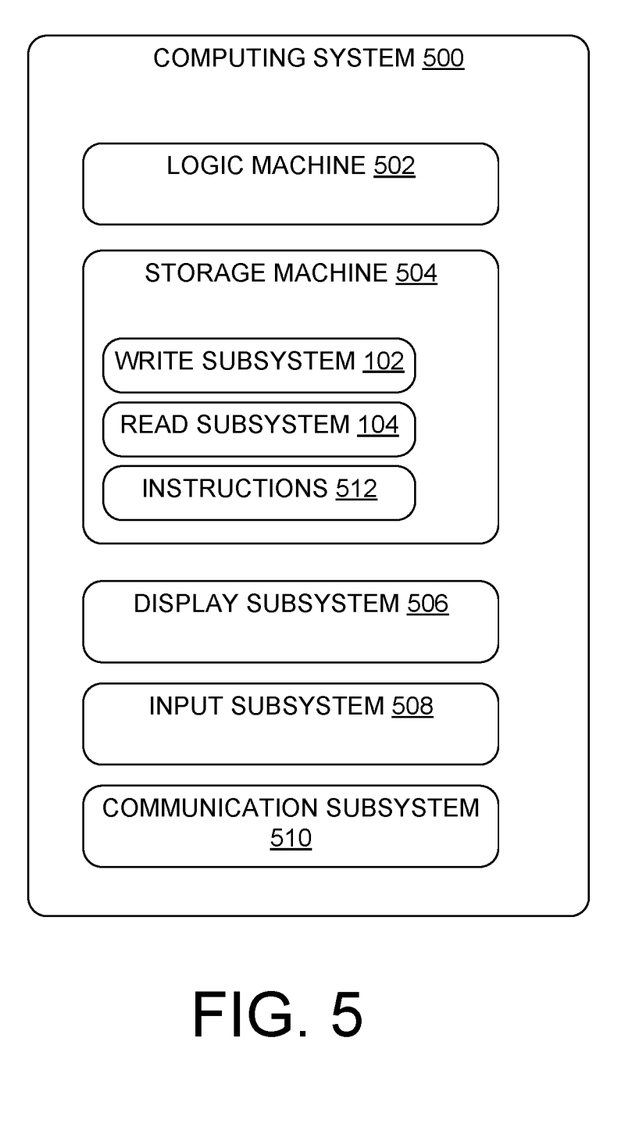
FIG. 5 depicts an exemplary computing system.

FIG. 5 schematically shows a non-limiting embodiment of a computing system 500 that can enact one or more of the methods and processes described above. Computing system 500 is shown in simplified form. Computing system 500 may take the form of one or more personal computers, server computers, tablet computers, home-entertainment computers, network computing devices, gaming devices, mobile computing devices, mobile communication devices (e.g., smart phone), and/or other computing devices.

Computing system 500 includes a logic machine 502 and a storage machine 504, which as indicated may contain write subsystem 102 and read subsystem 104 (or portions thereof).

Computing system 500 may optionally include a display subsystem 506, input subsystem 508, communication subsystem 510, and/or other components not shown in FIG. 5.

Logic machine 502 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result. For example, storage machine 504 contains instructions 512 executable by the logic machine to variously carry out operations described with reference to FIGS. 1-4, including maintaining parameter values in write subsystem 102 and read subsystem 104; receiving updated parameter values; receiving and processing requests to read parameter values; running batched updates; determining when to bypass batched updates and perform real-time updates for requested parameter values; processing read requests and producing display of real-time updated values along with other parameter values; etc.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 504 includes one or more physical devices configured to hold instructions executable by the logic machine to implement the methods and processes described herein. When such methods and processes are implemented, the state of storage machine 504 may be transformed—e.g., to hold different data.

Storage machine 504 may include removable and/or built-in devices. Storage machine 504 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 504 may include volatile, nonvolatile, dynamic, static, read/write, read-only, random-access, sequential-access, location-addressable, file-addressable, and/or content-addressable devices.

It will be appreciated that storage machine 504 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 502 and storage machine 504 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 500 implemented to perform a particular function. In some cases, a module, program, or engine may be instantiated via logic machine 502 executing instructions held by storage machine 504. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 506 may be used to present a visual representation of data held by storage machine 504 (e.g., a leaderboard or other display containing real-time update 140). This visual representation may take the form of a graphical user interface (GUI). As the herein described methods and processes change the data held by the storage machine, and thus transform the state of the storage machine, the state of display subsystem 506 may likewise be transformed to visually represent changes in the underlying data. Display subsystem 506 may include one or more display devices utilizing virtually any type of technology. Such display devices may be combined with logic machine 502 and/or storage machine 504 in a shared enclosure, or such display devices may be peripheral display devices.

When included, input subsystem 508 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 510 may be configured to communicatively couple computing system 500 with one or more other computing devices. Communication subsystem 510 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 500 to send and/or receive messages to and/or from other devices via a network such as the Internet.

Further examples will now be described. In these examples, and in the systems and methods described above, depicting or describing elements in a particular arrangement or order, or using delimiters such as (1), (2), etc., does not, absent description or context to the contrary, imply any particular ordering or sequencing. For example, among other things, such presentation does not dictate that operations happen in a particular order. Operations can occur in a different sequence, in parallel with other operations, or be omitted altogether. Still further, operations not shown or described may be implemented.

A first example is directed to a system for managing reads and writes from and to a sorted list of parameter values associated with users. The system comprises a write subsystem configured to hold a set of parameter values, each of which is associated with a user that caused that parameter value to be submitted to the write subsystem, each parameter value being changeable in response to user action. The system further comprises a read subsystem configured to hold a persistent copy of the set of parameter values, the persistent copy of the set of parameter values being variously inconsistent with the set of parameter values in the write subsystem due to pending updates not yet migrated from the write subsystem. The system further includes a logic machine configured to execute instructions contained in a storage machine to (1) periodically cause batched updates from the write subsystem to the read subsystem in which parameter values that have changed in the write subsystem relative to the persistent copy are written to the persistent copy; (2) receive a request to read a parameter value associated with a user; and (3) if the requested parameter value is not updated in the persistent copy at the time of the request, produce a real-time update of the requested parameter value by writing it to the persistent copy without waiting for a batched update scheduled for the requested parameter value.

In the first example recited above, the instructions may be configured to determine that the requested parameter value is not updated in the persistent copy at the time of the request by referring to the write subsystem. In some cases, the write subsystem includes a cache for each parameter value, and the instructions are configured to determine that the requested parameter value is not updated in the persistent copy by referring to the cache for the requested parameter value.

In the first example recited above, the instructions may be further configured to, in response to receiving the request, display the real-time update together with one or more other parameter values in the persistent copy. In the event of such display, at least some of the one or more other parameter values displayed with the real-time update may have pending updates in the write subsystem that have not been written to the persistent copy. In connection with this, for the one or more other parameter values displayed with the real-time update that have pending updates, the real-time update may be caused by a submission to the write subsystem subsequent to that of at least one of those one or more other parameter values.

In the first example recited above, the instructions may be further configured to, in response to receiving the request, display the real-time update together with one or more other parameter values in the persistent copy. In the event of such display, the one or more other parameter values displayed with the real-time update may have levels that are selected based on a level of the real-time update to provide a comparison to the real-time update. The instructions may be further configured to cause display of the real-time update and the one or more other parameter values by: (1) using a user ID of the user associated with the request to find a level of the real-time update and (2) based on that level, navigating search tree indices on the persistent copy to retrieve the one or more other parameter values.

In a second example, disclosed is a method for managing reads and writes from and to a sorted list of parameter values associated with users; including: (1) holding, within a write subsystem, a set of parameter values, each of which is associated with a user that caused that parameter value to be submitted to the write subsystem, each parameter value being changeable in response to user action; (2) holding, within a read subsystem, a persistent copy of the set of parameter values, the persistent copy of the set of parameter values being variously inconsistent with the set of parameter values in the write subsystem due to pending updates not yet migrated from the write subsystem; (3) periodically causing batched updates from the write subsystem to the read subsystem, such updating including writing parameter values that have changed in the write subsystem relative to the persistent copy to the persistent copy; (4) receiving a request to read a parameter value associated with a user; and (5) if the requested parameter value is not updated in the persistent copy at the time of the request, producing a real-time update of the requested parameter value by writing it to the persistent copy without waiting for a batched update scheduled for the requested parameter value.

In the second example recited above (method), the method may further include displaying the real-time update together with one or more other parameter values in the persistent copy. At least some of the one or more other parameter values displayed with the real-time update have pending updates in the write subsystem that have not been written to the persistent copy. For the one or more other parameter values displayed with the real-time update that have pending updates, the real-time update may be caused by a submission to the write subsystem subsequent to that of at least one of those one or more other parameter values.

In the example method, where the real-time update is displayed together with one or more other parameter values in the persistent copy, those one or more other parameter values may have levels that are selected based on a level of the real-time update to provide a comparison to the real-time update. In connection with this, displaying the real-time update together with the one or more other parameter values in the persistent copy may include: (1) using a user ID of the user associated with the request to find a level of the real-time update and (2) based on that level, navigating search tree indices on the persistent copy to retrieve the one or more other parameter values.

Further to the second example referenced above (method), determining that the requested parameter value is not updated in the persistent copy at the time of the request may be performed by referring to the write subsystem. Further, this may be performed by referring to the cache for the requested parameter value.

In a third example, disclosed is a system for managing reads and writes from and to a sorted list of parameter values associated with users; comprising. This example system includes: (1) a write subsystem configured to hold a set of parameter values, each of which is associated with a user that caused that parameter value to be submitted to the write subsystem, each parameter value being changeable in response to user action; (2) a read subsystem configured to hold a persistent copy of the set of parameter values, the persistent copy being variously inconsistent with the set of parameter values in the write subsystem due to pending updates not yet migrated from the write subsystem; and (3) a logic machine configured to execute instructions contained in a storage machine.

In this third example, the executable instructions may be configured to: (1) periodically cause batched updates from the write subsystem in which parameter values that have changed in the write subsystem relative to the persistent copy are written to the persistent copy; (2) receive a request to read a parameter value associated with a user; (3) if the requested parameter value is not updated in the persistent copy at the time of the request, produce a real-time update of the requested parameter value by writing it to the persistent copy without waiting for a batched update scheduled for the requested parameter value; (4) search the persistent copy for one or more other parameter values having levels based on a level of the real-time update to provide a comparison to the real-time update; and (5) display the real-time update together with the one or more other parameter values and user identifiers associated with those one or more other parameter values. In this example, at least some of the one or more other parameter values displayed with the real-time update may have pending updates in the write subsystem that have not been processed.

In the third example above, the instructions may be configured to cause display of the real-time update and the one or more other parameter values by (1) using a user ID of the user associated with the request to find a level of the real-time update and (2) based on that level, navigating search tree indices on the persistent copy to retrieve the one or more other parameter values. In the third example above, the instructions may be configured to determine that the requested parameter value is not updated in the persistent copy at the time of the request by referring to a cache for the requested parameter value in the write subsystem.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A system for managing reads and writes from and to a sorted list of parameter values associated with users, comprising:
   a write subsystem configured to hold a set of parameter values, each of which is associated with a user that caused that parameter value to be submitted to the write subsystem based on an adjustment in a user performance metric associated with the system, the user performance metric adjusted via user interaction with a user device, each parameter value being changeable in response to user action;
   a read subsystem configured to hold a persistent copy of the set of parameter values, the persistent copy of the set of parameter values being variously inconsistent with the set of parameter values in the write subsystem due to pending updates not yet migrated from the write subsystem; and
   a logic machine configured to execute instructions contained in a storage machine to:
      periodically cause batched updates from the write subsystem to the read subsystem in which parameter values that have changed in the write subsystem relative to the persistent copy are written to the persistent copy;
      receive a request to read a parameter value associated with a user;
      responsive to determining that the requested parameter value is not updated in the persistent copy at the time of the request, produce a real-time update of the requested parameter value by writing it to the persistent copy without waiting for a batched update scheduled for the requested parameter value; and
      in response to receiving the request, display the real-time update together with one or more other parameter values in the persistent copy that are not included in the request, where at least some of the one or more other parameter values displayed with the real-time update have pending updates in the write subsystem that will be written to the persistent copy at a next batched update, but have not yet been written to the persistent copy.

2. The system of claim 1, wherein determining that the requested parameter value is not updated in the persistent copy at the time of the request includes referring to the write subsystem, and wherein the adjustment in the user performance metric occurs is based on one or more user achievements in a multi-player game.

3. The system of claim 2, where the write subsystem includes a cache for each parameter value, and where the instructions are configured to determine that the requested parameter value is not updated in the persistent copy by referring to the cache for the requested parameter value.

4. The system of claim 1, where for the one or more other parameter values displayed with the real-time update that have pending updates, the real-time update was caused by a submission to the write subsystem subsequent to that of at least one of those one or more other parameter values.

5. The system of claim 1, where the one or more other parameter values displayed with the real-time update have levels that are selected based on a level of the real-time update to provide a comparison to the real-time update.

6. The system of claim 5, where the instructions are configured to cause display of the real-time update and the one or more other parameter values by: (1) using a user ID of the user associated with the request to find a level of the real-time update and (2) based on that level, navigating search tree indices on the persistent copy to retrieve the one or more other parameter values.

7. A method for managing reads and writes from and to a sorted list of parameter values associated with users, comprising:
   holding, within a write subsystem, a set of parameter values, each of which is associated with a user that caused that parameter value to be submitted to the write subsystem based on an adjustment in a user performance metric, the user performance metric adjusted via user interaction with a user device, each parameter value being changeable in response to user action;
   holding, within a read subsystem, a persistent copy of the set of parameter values, the persistent copy of the set of parameter values being variously inconsistent with the set of parameter values in the write subsystem due to pending updates not yet migrated from the write subsystem;
   periodically causing batched updates from the write subsystem to the read subsystem, such updating including writing parameter values that have changed in the write subsystem relative to the persistent copy to the persistent copy;

receiving a request to read a parameter value associated with a user;

responsive to determining that the requested parameter value is not updated in the persistent copy at the time of the request, producing a real-time update of the requested parameter value by writing it to the persistent copy without waiting for a batched update scheduled for the requested parameter value; and in response to receiving the request, displaying the real-time update together with one or more other parameter values in the persistent copy that are not included in the request, where at least some of the one or more other parameter values displayed with the real-time update have pending updates in the write subsystem that will be written to the persistent copy at a next batched update, but have not yet been written to the persistent copy.

8. The method of claim 7, where for the one or more other parameter values displayed with the real-time update that have pending updates, the real-time update was caused by a submission to the write subsystem subsequent to that of at least one of those one or more other parameter values.

9. The method of claim 7, where the one or more other parameter values displayed with the real-time update have levels that are selected based on a level of the real-time update to provide a comparison to the real-time update.

10. The method of claim 9, where displaying the real-time update together with the one or more other parameter values in the persistent copy includes: (1) using a user ID of the user associated with the request to find a level of the real-time update and (2) based on that level, navigating search tree indices on the persistent copy to retrieve the one or more other parameter values.

11. The method of claim 7, where determining that the requested parameter value is not updated in the persistent copy at the time of the request is performed by referring to the write subsystem.

12. The method of claim 11, where the write subsystem includes a cache for each parameter value, and where determining that the requested parameter value is not updated in the persistent copy at the time of the request is performed by referring to the cache for the requested parameter value.

13. A system for managing reads and writes from and to a sorted list of parameter values associated with users, comprising:

a write subsystem configured to hold a set of parameter values, each of which is associated with a user that caused that parameter value to be submitted to the write subsystem based on an adjustment in a user performance metric associated with the system, the user performance metric adjusted via user interaction with a user device, each parameter value being changeable in response to user action;

a read subsystem configured to hold a persistent copy of the set of parameter values, the persistent copy being variously inconsistent with the set of parameter values in the write subsystem due to pending updates not yet migrated from the write subsystem; and a logic machine configured to execute instructions contained in a storage machine to:

periodically cause batched updates from the write subsystem in which parameter values that have changed in the write subsystem relative to the persistent copy are written to the persistent copy;

receive a request to read a parameter value associated with a user;

responsive to determining that the requested parameter value is not updated in the persistent copy at the time of the request, produce a real-time update of the requested parameter value by writing it to the persistent copy without waiting for a batched update scheduled for the requested parameter value;

search the persistent copy for one or more other parameter values that are not included in the request, the one or more other parameter values having levels based on a level of the real-time update to provide a comparison to the real-time update; and display the real-time update together with the one or more other parameter values and user identifiers associated with those one or more other parameter values where at least some of the one or more other parameter values displayed with the real-time update have pending updates in the write subsystem that will be written to the persistent copy at a next batched update, but have not yet been written to the persistent copy.

14. The system of claim 13, where the instructions are configured to cause display of the real-time update and the one or more other parameter values by (1) using a user ID of the user associated with the request to find a level of the real-time update and (2) based on that level, navigating search tree indices on the persistent copy to retrieve the one or more other parameter values.

15. The system of claim 13, wherein determining that the requested parameter value is not updated in the persistent copy at the time of the request includes referring to a cache for the requested parameter value in the write subsystem.

* * * * *